3,012,979
COMPOSITIONS FROM TRIMELLITIC ANHYDRIDE, EPOXYS AND FATTY ACIDS

James R. Stephens, Gary, and Richard E. Van Strien, Griffith, Ind., assignors to Standard Oil Company, Chicago, Ill., a corporation of Indiana
No Drawing. Filed Apr. 22, 1959, Ser. No. 807,995
7 Claims. (Cl. 260—18)

This invention relates to unsaturated polyester resins particularly adapted for use as air drying surface coating materials.

It has been found that certain condensates of trimellitic anhydride and 1,2-epoxide can be further reacted with unsaturated fatty acids to produce unsaturated polyester resins which possess air drying characteristics making them suitable for air drying surface coatings.

The epoxy compounds which are employed as components of the invention are mono-epoxide compounds having a 1,2-epoxy group. Such compounds have the general formula

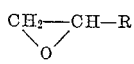

wherein R may be hydrogen, an aliphatic radical or an aromatic radical. Typical epoxy compounds which can be employed in the process include ethylene oxide, propylene oxide, butylene oxide, styrene oxide and epichlorohydrin. Mixtures of these epoxy compounds can be employed, especially mixtures of ethylene oxide or propylene oxide.

The trimellitic-epoxy condensate is prepared by reacting the epoxy and the anhydride in a molar ratio such that the condensate has an acid number from about 0 to about 15, and a hydroxyl number from about 150 to about 250 (herein acid number and hydroxyl number are to be understood as the mg. of KOH used per gram of material tested). In general, the epoxide:anhydride mole ratio is between about 4:1 and about 7:1. The acid and the epoxide are added together, usually in the presence of a catalyst, and the materials intermingled for the time needed to essentially complete the condensation reaction at reaction temperature from 15° C. to about 50° C. It is preferred to control the reaction at temperatures corresponding to ambient, namely, from about 20° C. to about 35° C.

The theoretical hydroxyl number obtainable at a particular epoxide:anhydride mole ratio will vary with the particular epoxide reacted. It is simple enough to obtain the particular hydroxyl number desired with a particular reacting pair by varying the mole ratio of reactants.

As catalyst for the condensation reaction there may be employed inorganic or organic bases such as alkali hydroxide, calcium oxide, sodium amide, secondary amines such as di-ethylamine, dibutylamine, piperidine and the like and tertiary amines such as trimethylamine, triethanolamine, pyridine and the like. We prefer to employ tertiary organic amines usually in an amount of about 0.1% to about 5% based on the weight of trimellitic anhydride employed.

It is pointed out that the condensation reaction conditions must be controlled in order to avoid gelation of the condensate. In general, the anhydride is added incrementally to epoxide maintained at about its reflux temperature. In some cases it is necessary to apply cooling to the condensation zone in order to avoid temperatures which would result in an undesired cross-linking reaction.

The condensate is reacted with an unsaturated fatty acid containing from 10 to 30 carbon atoms. Examples of suitable unsaturated fatty acids are: caproleic, lauroleic, undecylenic, palmitoleic, oleic, gadoleic, cetoleic, shibic, erucic, linoleic, linolenic.

In addition to single pure unsaturated fatty acids, such as are illustrated above, mixtures of unsaturated fatty acids which are derived from drying oils are suitable for use in the invention. The drying oils include those vegetable and marine oils which are well-known as having air drying characteristics. Examples of these vegetable and marine oils are linseed oil, soybean oil, tung oil, castor oil and perilla oil. The mixtures of fatty acids derivable from these oils are the unsaturated fatty acids—hereinafter called drying oil fatty acids—which are a preferred source of fatty acid for the preparation of the polyester resin of the invention. Particularly suitable is the cheap soya fatty acid.

In addition to the pure compounds and the drying oil fatty acids, the fatty acids contained in tall oil are suitable for use in the invention. Particularly good is the commercially available mixture known as distilled tall oil fatty acids.

The condensate and the unsaturated fatty acid are reacted in amounts such that theoretically all of the hydroxyl groups present are reacted by the carboxyl groups in the unsaturated fatty acid. In general a slight excess of fatty acid is used, giving a final resin product having an acid number between about 20 and about 50. The reaction between the defined condensate and the defined fatty acid is carried out at a temperature between about 150° C. and 275° C. until the resin product had the desired acid number as defined above. It is preferred to maintain the reaction temperature between about 160 and 230° C.

The unsaturated polyester resins of the invention are characterized by the ability to form air dried surface coatings when applied to the surface in the form of a film. The resin itself may be applied at a temperature suitable for the formation of a thin film on the surface to be coated. Or the resin may be dissolved in a solvent and the solution applied to the surface to be coated. The resin may be used without pigmentation or fillers when a clear film is desired. Or the polyester may be mixed with suitable pigments and/or fillers to provide opaque colored films.

Example

A mixture of 274 g. (1.42 moles) of trimellitic anhydride and 414 g. (7.15 moles) of propylene oxide was stirred at room temperature. One and four-tenths milliliter of pyridine was then added and the mixture allowed to exotherm with intermittent cooling to keep the temperature below the boiling point of propylene oxide (37° C.). After the exotherm ceased, the mixture was left standing three days to complete the reaction. The resinous product was filtered under pressure, then precipitated by agitating in a "Waring Blendor" with 0.1 N NaOH. The product was reagitated with 0.1 N HCl and then with water. It was finally dried under vacuum for several hours to yield a white brittle solid.

The above condensate had an acid number of 3, a hydroxyl number of 178, an ester number of 464, and a molecular weight of 2700 plus or minus 400 (the molecular weight was determined in acetone solution by the ebullioscopic method which is, unfortunately, very sensitive to impurities such as water and propylene oxide).

Forty grams of this condensate and 31 g. of soya fatty acids were put into a flask and heated. At 160° C. the two materials formed a homogeneous solution. The materials were heated for 5 hours using rising temperatures from 160° C. to 230° C. When the heating was stopped the product was a very viscous material having an acid number of 46.

Tests of this viscous resin as a film either direct or from acetone solution show hard films produced by air drying at room temperature.

Thus having described the invention what is claimed is:

1. A resin suitable for preparation of air drying films prepared by reacting (1) a condensate of a 1,2-epoxide and trimellitic anhydride, in a molar ratio such that said condensate has an acid number from about 0 to about 15 and a hydroxyl number from about 150 to about 250, said anhydride and said epoxide being reacted at a temperature from about 15° C. to about 50° C. for a time needed to essentially complete said reaction with (2) an unsaturated fatty acid containing from 10 to 30 carbon atoms, in an amount such that theoretically all of the hydroxyl groups present in said condensate are reacted by carboxyl groups in said fatty acid, said condensate and said fatty acid being reacted at a temperature between about 150° C. and 275° C. until the resin product has an acid number between about 20 and about 50.

2. The resin of claim 1 wherein said epoxide is selected from the class consisting of ethylene oxide, propylene oxide, butylene oxide and epichlorohydrin.

3. The resin of claim 1 wherein said epoxide:anhydride mole ratio is between about 4:1 and about 7:1.

4. The resin of claim 1 wherein said fatty acid is selected from the class consisting of drying oil fatty acids.

5. The resin of claim 4 wherein said epoxide is propylene oxide and said fatty acid is soya fatty acid.

6. The resin of claim 4 wherein said epoxide is propylene oxide and said fatty acid is tall oil fatty acid.

7. An unsaturated resin prepared by reacting (a) propylene oxide and trimellitic anhydride in a mole ratio between about 4:1 and 7:1, in the presence of a condensation catalyst, at a temperature between about 15° C. and 50° C. until substantially all of said oxide has been reacted, and (b) soya fatty acids in approximately the stoichiometric amount to react with the hydroxyl groups present in said condensate, at a temperature from about 160° C. to 230° C. for a time such that the acid number of the resin product is between about 20 and 50.

References Cited in the file of this patent

UNITED STATES PATENTS

| | | |
|---|---|---|
| 2,809,177 | Shokal | Oct. 8, 1957 |
| 2,886,472 | Condo et al. | May 12, 1959 |

OTHER REFERENCES

"Trimellitic Anhydride," published by Amoco Chemicals Corp., Chicago, Ill., Oct. 29, 1958, pages 1–32.